United States Patent
Gupta et al.

(10) Patent No.: US 7,725,418 B2
(45) Date of Patent: May 25, 2010

(54) RESPONDING TO SITUATIONS USING MULTIDIMENSIONAL SEMANTIC NET AND BAYES INFERENCE

(75) Inventors: Rakesh Gupta, Mountain View, CA (US); Vasco Calais Pedro, Lisbon (PT)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/046,343

(22) Filed: Jan. 28, 2005

(65) Prior Publication Data

US 2006/0184491 A1    Aug. 17, 2006

(51) Int. Cl.
  *G06N 5/02*    (2006.01)
(52) U.S. Cl. ........................................ 706/50
(58) Field of Classification Search .................. 706/50
  See application file for complete search history.

(56) References Cited

U.S. PATENT DOCUMENTS

| | | | |
|---|---|---|---|
| 4,638,445 | A | 1/1987 | Mattaboni |
| 4,884,217 | A | 11/1989 | Skeirik et al. |
| 5,392,382 | A | 2/1995 | Schoppers |
| 5,717,598 | A | 2/1998 | Miyakawa et al. |
| 5,774,632 | A | 6/1998 | Kaske |
| 5,889,926 | A | 3/1999 | Bourne et al. |
| 6,135,396 | A | 10/2000 | Whitfield et al. |
| 6,247,008 | B1 | 6/2001 | Cambot et al. |
| 6,353,814 | B1 | 3/2002 | Weng |
| 6,493,607 | B1 | 12/2002 | Bourne et al. |
| 6,581,048 | B1 | 6/2003 | Werbos |
| 6,604,094 | B1 | 8/2003 | Harris |
| 6,687,685 | B1 | 2/2004 | Sadeghi et al. |

(Continued)

FOREIGN PATENT DOCUMENTS

JP    H09-245015    9/1997

(Continued)

OTHER PUBLICATIONS

Rakesh Gupta, Mykel J. Kochenderfer "Common Sense Data Acquisition for Indoor Mobile Robots" American Association for Artificial Intelligence, Jul. 25-29, 2004.*

(Continued)

*Primary Examiner*—David R Vincent
*Assistant Examiner*—Lut Wong
(74) *Attorney, Agent, or Firm*—Fenwick & West LLP; Mark E. Duell (57) ABSTRACT

A system, apparatus and application for providing robots with the ability to intelligently respond to perceived situations are described. A knowledge database is assembled automatically, based on distributed knowledge capture. The knowledge base embodies the "common sense," that is, the consensus, of the subjects who contribute the knowledge. Systems are provided to automatically preprocess, or "clean" the information to make it more useful. The knowledge thus refined is utilized to construct a multidimensional semantic network, or MSN. The MSN provides a compact and efficient semantic representation suitable for extraction of knowledge for inference purposes and serves as the basis for task and response selection. When the robot perceives a situation that warrants a response, an appropriate subset of the MSN is extracted into a Bayes network. The resultant network is refined, and used to derive a set of response probabilities, which the robot uses to formulate a response.

27 Claims, 8 Drawing Sheets

U.S. PATENT DOCUMENTS

| | | | |
|---|---|---|---|
| 6,862,497 | B2 | 3/2005 | Kemp et al. |
| 2002/0129015 | A1 | 9/2002 | Caudill et al. |
| 2003/0093514 | A1 | 5/2003 | Valdes et al. |
| 2004/0111408 | A1 | 6/2004 | Caudill et al. |
| 2005/0278362 | A1 | 12/2005 | Maren et al. |
| 2006/0004683 | A1* | 1/2006 | Talbot et al. .................. 706/59 |

FOREIGN PATENT DOCUMENTS

| | | |
|---|---|---|
| JP | H10-149287 | 6/1998 |
| JP | 2001-157979 | 6/2001 |

OTHER PUBLICATIONS

Singh et al ("LifeNet: A Propositional Model of Ordinary Human Activity" 2003).*

Liu et al ("OMCSNet: A commonsense Inference Toolkit" 2003).*

Liu et al ("ConceptNet: A Practical Commonsense Reasoning Toolkit").*

Eagle et al ("context sensing using speech and common sense" May 2004).*

Artificial Intelligence—A Modern Approach, Second Edition, Russell and Norvig, Prentice Hall, New Jersey 2003/1995, pp. 462-536.

Brill, Eric A Simple-Rule Based Part-of-Speech Tagger, Proceedings of ANLP-92, 34d Conference on Applied Natural Language Processing, Trento, IT, 1992, pp. 1-4.

Gupta, Rakesh et al., "Common Sense Data Acquisition for Indoor Mobile Robots," Nineteenth National Conference on Artificial Intelligence (AAAI-04), Jul. 25-29, 2004, pp. 1-6.

Stork, David G., "Open Mind Initiative," ICDAR99, Bangalore, India, pp. 1-28.

Arroyo, A.A., "A Prototype Natural Language Processing System for Small Autonomous Agents," Machine Intelligence Laboratory, Department of Electrical and Computer Engineering, University of Florida, pp. 1-6.

Baumgartner, P. et al., "Automated Reasoning Support for SUMO/KIF," Max-Planck-Institute for Computer Science, Saarbrucken, Germany, Feb. 4, 2005, pp. 1-18.

Kalinichenko, L.A., "Rule-Based Concept Definitions Intended for Reconciliation of Semantic Conflicts in the Interoperable Information Systems," Institute for Problems of Informatics, Proceedings of the Second International Baltic Workshop on DB and IS, Jun. 1996, pp. 1-12.

Kurfess, F.J., "CPE/CSC 481: Knowledge-Based Systems," 2005-6, Retrieved from the Internet<URL:www.csc.calpoly.edu/~fkurfess/Courses/481/Slides/>.

Laskey, K.B., "Knowledge Representation and Inference for Multisource Fusion," Apr. 2002, Retrieved from the Internet<URL:www.msri.org/publications/ln/hosted/nas/2002/laskey/1/banner/01.html>.

"Markov Chain," Wilipedia, the free encyclopedia, [online] [Retrieved on Mar. 30, 2006] Retrieved from the Internet<URL: http://en.wikipedia.org/wiki/Markcov_chain>.

Matsuda, Y. et al., "Synthesis of Multiple Answer Evaluation Measures Using a Machine Learning Technique for a QA System," Proceedings of the NTCIR-5 Workshop Meeting, Dec. 6-9, 2005, 7 pages.

"Mixed-Initiative Activity Planning," NASA Ames Research Center, 2004, [online] [Retrieved on Nov. 21, 2006] Retrieved from the Internet<URL:http://ic.arc.nasa.gov/publications/pdf/Mixed_Initiative_Act.pdf>.

Setiono, R. et al., "Automatic Knowledge Extraction from Survey Data: Learning $M$-of-$N$ Constructs Using a Hybrid Approach," Journal of the Operational Research Society, 2005, pp. 3-14, vol. 56.

Soricut, R. et al., "Automatic Question Answering: Beyond the Factoid," [online] [Retrieved on Nov. 28, 2006] Retrieved from the Internet<URL:http://acl.ldc.upenn.edu/hlt-naacl2004/main/pdf/104_Paper.pdf>.

International Search Report and Written Opinion, PCT/US06/23822, Oct. 9, 2007.

International Search Report and Written Opinion, PCT/US06/02204, Feb. 13, 2008.

International Search Report and Written Opinion, PCT/US07/61061, Nov. 26, 2007.

International Search Report and Written Opinion, PCT/US06/23554, Mar. 20, 2008.

Fei, T., et al., Question Classification for E-learning by Artificial Neural Network, IEEE, 2003, p. 1757-1761.

Klein, D., et al., "Prasing with Treebank Grammars: Empirical Bounds, Theoretical Models, and the Structure of the Penn Treebank," Proceedings of the $39^{th}$ Annual Meeting of the ACL, 2001.

Pratt, L., "Non-literal Transfer Among Neural Network Learners," Jan. 7, 1993, p. 1-25.

Stork, D., et al., "The OpenMind Initiative," IEEE Experts Systems and Their Applications, May/Jun. 1999, p. 19-20, vol. 14, No. 3.

Waibel, A., et al., "Modularity and Scaling in large Phonemic Neural Networks," IEEE Transactions on Acoustics, Speech, and Signal Processing, Dec. 1989, p. 1888-1898, vol. 37, No. 12.

Zhang, W., "Representation of Assembly and Automatic Robot Planning by Petri Net," IEEE Transactions on Systems, Man, and Cybernetics, Mar./Apr. 1989, vol. 19, No. 2.

Raynor, W., "The internation dictionary of Artificial Intelligence," 1999, cover and p. 186 only.

Elena, G., "An Approach to Designing Intelligent Decision-Making Support Systems on the Basis of the Logic-Semiotic Apparatus," Proceedings of the 2002 IEEE International Conference on Artificial Intelligence System, (ICAIS'02), 2002, 8 Pages.

Non-Final Office Action, Japanese Patent Application No. P2008-520252, Oct. 20, 2009, 14 Pages.

Non-Final Office Action, Japanese Patent Application No. P2008-520252, Jul. 6, 2009, 9 Pages.

Inamura, T., PEXIS: Probabilistic Experience Representation Based Adaptive Interaction System for Personal Robots, IEICE Transactions, The Institute of Electronics, Information and Communication Engineers, Jun. 1, 2001, vol. J84-D-1, No. 6, pp. 867-877.

Japanese Office Action, Japanese Patent Application No. P2008-520252, Feb. 2, 2010, 17 pages.

Japanese Office Action, Japanese Patent Application No. P2008-553450, Feb. 17, 2010, 7 pages.

* cited by examiner

| Edge Type | Example | Definition / note |
|---|---|---|
| has_object | floor_slippery → floor | |
| has_property | floor_slippery → slippery | |
| has_action | sweep_floor → sweep | |
| response | floor_mat_wet → dry_floor_mat | situation → action |
| patient | shake_infant → infant | |
| causes | trash_in_trash_can → house_to_be_clean | situation → situation |
| lemmas | dogs → dog | |
| synonyms | infant → baby | |
| hypernym | knife → tableware | |
| hyponym | dog → poodle | |

RESPONDING TO SITUATIONS USING MULTIDIMENSIONAL SEMANTIC NET AND BAYES INFERENCE

FIELD OF THE INVENTION

The present invention generally relates to the field of machine learning, and more specifically, to responding to situations based on distributed knowledge capture and inference.

BACKGROUND OF THE INVENTION

Humanoid robots represent a major step in applying machine technology toward assisting persons in the home. Potential applications include assisted living, wherein a robot could help bring an elderly person his medicine or glasses or assist the handicapped. Additional applications may encompass a myriad of daily activities, such as performing household chores, attending infants and responding to calls and queries. Through visual and voice recognition techniques, robots may be able to recognize and greet their users by name. In addition, robots should be able to learn through human interaction and other methods.

Fundamental to these goals is the ability to endow robots in indoor environments with the ability to effectively interact with their users and with other people and the environment. In particular, robots must be able to respond "appropriately" to given situations, that is, so as to satisfy the perceived desires of their users. Importantly, the robot need not find the "right" response, but rather the one that reflects the majority consensus opinion. This is referred to as "common sense." Thus, a robot must be instilled with a knowledge base, and with a means of formulating responses to perceived situations. Furthermore, robots should be capable of adding to their knowledge bases online.

Figure 1:
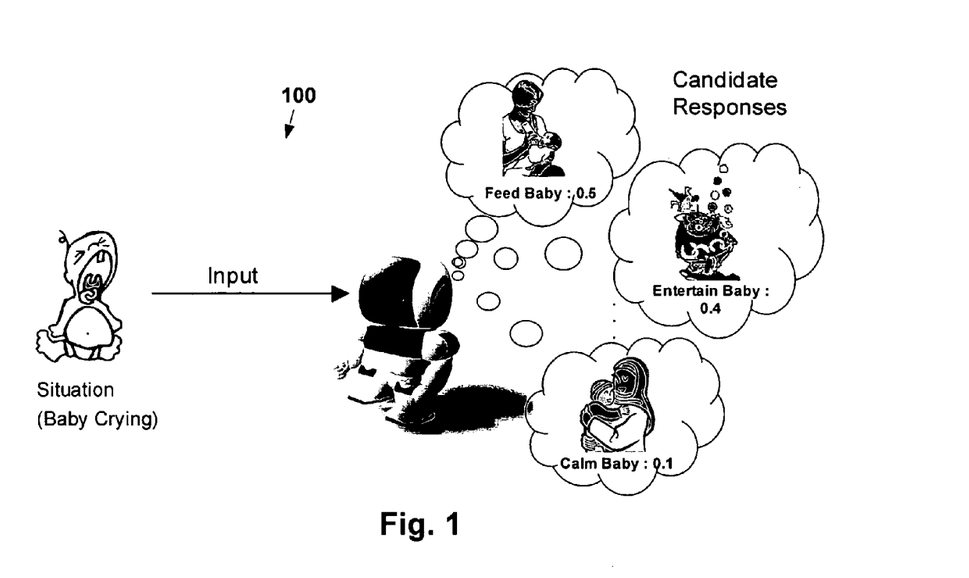
FIG. 1 illustrates a hypothetical situation perceived by a robot, and candidate responses determined by the robot.

For example, a robot may observe a baby crying, as shown in FIG. 1. An internal knowledge base might indicate that several responses might be appropriate, including feeding, entertaining and calming the baby. A second database or algorithm may include or calculate some indicia of the relative likelihood that a particular response is most appropriate in this situation. The robot will initiate the most likely response according to distributed knowledge. Over time, the robot would modify the likelihood information according to changes in the knowledge base.

Conventional solutions to such problems have included rule-based systems, which represent an important part of reasoning in artificial intelligence (AI). Although rule-based systems provide efficient and elegant knowledge representation, they exhibit several weaknesses that reduce their usability in the large-domain, real-time reasoning applications of interest. First, the handcrafted rules require manual effort by specialists in the domain who are fluent in the pertinent representations. Second, maintaining the consistency of the large set of rules required to deal with a large domain becomes increasingly difficult as the number of rules grows. As a consequence, the rule sets are generally not scalable to the millions of pieces of knowledge required. Third, the systems may break down when rules conflict. Finally, when retrieving the knowledge from the knowledge base, the reasoning process is limited to literal matching of the preconditions of the rules.

Other conventional approaches have involved a variety of mechanisms for storing knowledge and for formulating responses to situations. For example, MindNet (Dolan, Richardson, & Vanderwende 1998) receives knowledge from a dictionary, but can comprehend only a limited number of relations (e.g. used_for). Cyc (Lenat & Guha 1990) relies upon manual formation of rules. Cyc includes more than a million rules entered by over 50 people over the last 15 years; it initially utilized a human-like reasoning system but has evolved to specialize in defense applications. The information embodied in the MIT Media Lab Common Sense reasoning project (Liu & Singh 2004) is too broad, and the knowledge is not dense enough for the deep inferences required. Similarly, other common sense knowledge bases have attempted to capture very broad but overly sparse human common sense knowledge (Liu, Lieberman, & Selker 2003; Eagle, Singh, & Pentland 2003; Mueller 1998; Guha et al. 1990).

Attempts to mitigate these shortcomings have involved alternative techniques including knowledge capture, linguistic tools and Bayesian reasoning. For example, common sense knowledge may be gathered from non-specialist "netizens," using distributed techniques, as with the *Open Mind Initiative* (Stork 1999; 2000). While offering advantages over other methods, distributed knowledge capture results in "messy" knowledge, e.g., having redundancy, missing relationships, mis-spelling and error. Thus, processing is required to refine such knowledge into a form useful for providing robots with knowledge.

Accordingly, there is a need for an improved method for providing robots with the ability to satisfy perceived desires or requests of their users. The method should be reliable and flexible, guided by notions of common sense and instilled with the ability to learn through interaction with humans and the environment.

SUMMARY OF THE INVENTION

The present invention meets these needs with a method, apparatus and application for providing robots with the ability to intelligently respond to perceived situations. According to one aspect of the invention, a knowledge database is assembled automatically, based on distributed knowledge capture. Specifically, the knowledge is contributed by many human subjects, in response to templates containing written queries. By conducting this activity over the worldwide web, contributions from a great number of people may be practically collected. As a benefit, the knowledge base embodies the "common sense," that is, the consensus, of the subjects.

As can be appreciated, the "raw" knowledge thus gathered is initially "noisy." That is, the knowledge contains, e.g., redundancy, error and mis-spelling. Means such as linguistic tools are provided to automatically preprocess, or "clean" the information to make it more accurate and useful. The knowledge thus refined is next utilized to construct a multidimensional semantic network, or MSN. The MSN provides a compact and efficient semantic representation suitable for extraction of knowledge for inference purposes. The MSN includes relationships between individual pieces of knowledge, as well as notions of real-life situations and responses. It thereby serves as the basis for task and response selection. Additional linguistic techniques, including expansion and contraction, are used to increase the overlap of knowledge within the MSN, making it "denser," and thereby more useful.

When the robot perceives a situation that warrants a response, an appropriate subset of the MSN is extracted into a Bayes network. The latter is refined, and used to derive a set of response probabilities, which the robot uses to formulate a response.

In a practical implementation, the system thus described can be scaled to accommodate millions of pieces of knowledge, and to find an appropriate response to a given situation. The system is independent of word usage, and weights the common sense responses by frequency of occurrence to handle conflicts.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings; in which:

DETAILED DESCRIPTION OF THE PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 2:
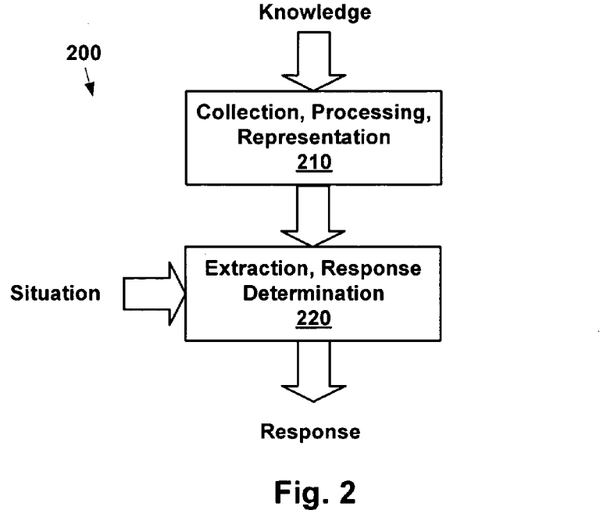
FIG. 2 shows one embodiment of the method of the invention.

The method of the present invention according to one embodiment is shown in FIG. 2. "Raw" knowledge is assembled into a knowledge database 210. The knowledge may derive from a variety of sources, including databases and humans. Database 210 may be assembled automatically, and resides within a robot or other mobile machine that serves a user. The knowledge may be organized in a graphical representation for more efficient subsequent processing, as will be discussed. When a situation is perceived by the robot, an appropriate subset of the knowledge database is extracted and optimized 220. Then, a number of candidate responses are determined, and the response that is most likely desired by the user is performed by the robot. According to one embodiment, database 210 and response determination 220 are refined through experience as the robot interacts with and learns from its environment and user.

Figure 3:
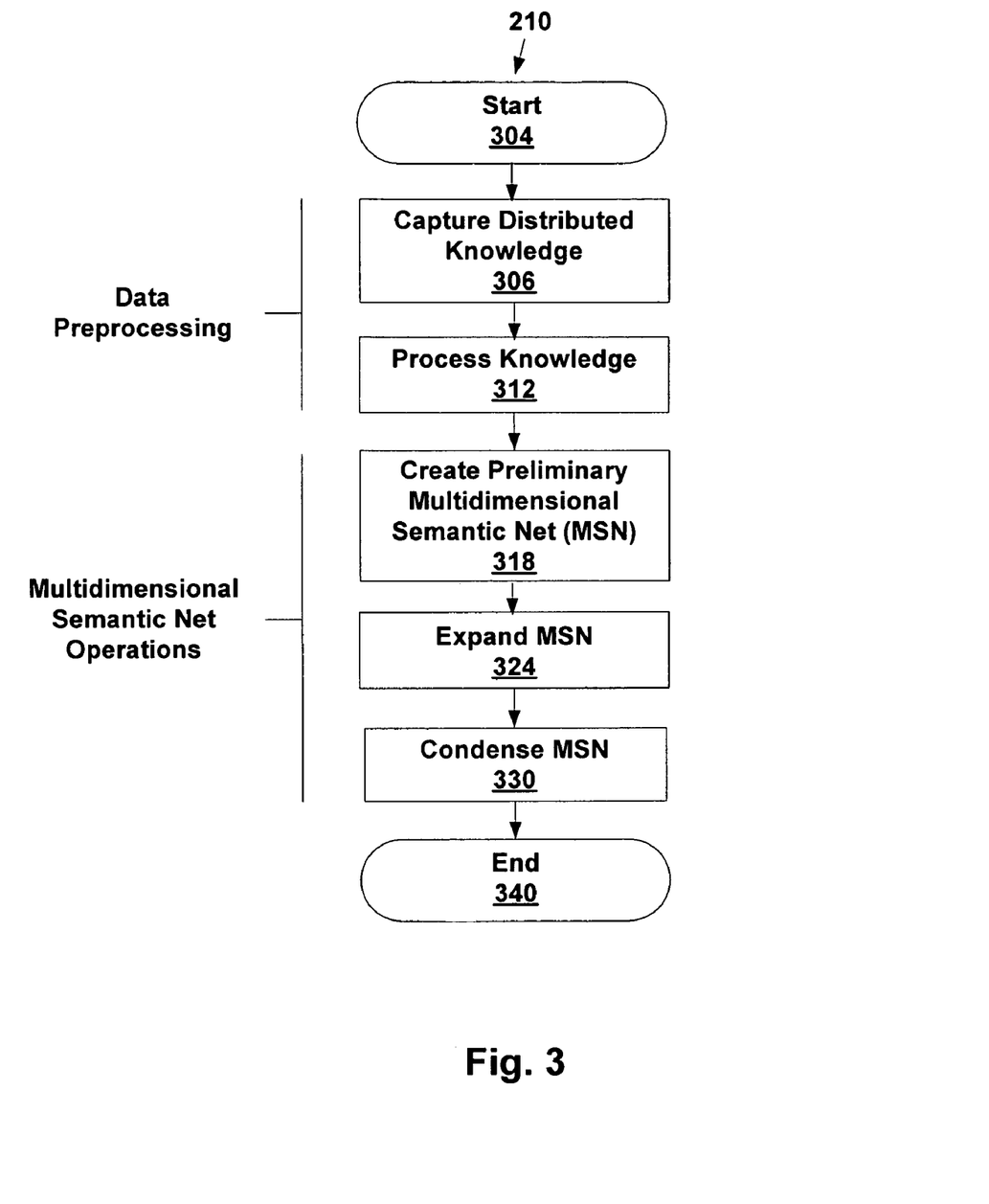
FIG. 3 illustrates one embodiment for the derivation of a multidimensional semantic network.

Knowledge database operations 210 are further illustrated in FIG. 3. First, distributed knowledge is captured 306. Such knowledge may be derived from many sources, potentially comprising databases, articles and contribution from human subjects. According to one embodiment, knowledge is collected from multiple human subjects responding to queries made available over the worldwide web. The queries have the form of "sentence templates," e.g., natural-language sentences with blanks. A respondent enters words or phrases as he or she deems appropriate to complete the sentences. As responses from more subjects are collected, the knowledge base embodies the frequency of response, and thus consensus, of the respondents. This ultimately enables the robot to respond to situations based on a notion of "common sense." For example, if in real life more people respond to a crying baby by feeding the baby versus entertaining the baby, the robot would first feed a crying baby, and, if unsuccessful, would resort to entertaining the crying baby.

To enhance efficiency, the scope of the knowledge may be constrained to matters regarding, e.g., indoor or other environments, as well as to real objects, according to the expected application. Furthermore, the database may be object-centric. That is, objects are characterized by their properties, and actions taken by the robot are assumed to be grounded in the properties. For example, for domestic applications, the knowledge may focus on articles in the home, such as trash cans and coffee makers. In addition, the knowledge may also focus on actions commonly performed in connection with various properties of such articles. For example, if the trash can is full, there is associated a need to empty it. As a benefit, the database is more "dense," that is, it contains repetitions of knowledge regarding notions of articles and actions within the environment of interest. A discussion of this can be found in Gupta and Kochenderfer, "Common Sense Data Acquisition for Indoor Mobile Robots," *Nineteenth National Conference on Artificial Intelligence (AAAI-04)*, 2004, which is incorporated herein in its entirety The raw data thus captured is "noisy." In other words, the data requires refinement before it may be practically useful. For example, the data may contain spelling errors, which, if uncorrected, would create non-existent concepts and reduce the amount of valid data. Also, redundant words may be present. Accordingly, processing 312 may be applied to "clean" the data using such tools as spell checking and non-essential word removal. For example, the phrase "the cup from the supermarket" may be reduced by eliminating descriptors, yielding the noun reference "the cup." Applying the rule that "A of B" gives "B" as the object reduces "bunch of flowers" to "flowers." Similarly, removal of determiners gives "book" from "the book." Where a noun is preceded by an adjective, adjective removal gives, e.g., "car" from "red car." A description of this can be found in Brill, "A Simple Rule-based Part-of-speech Tagger," *Proceedings of ANLP-92, 3rd Conference on Applied Natural Language Processing*, Trento, IT, 1992, which is incorporated herein in its entirety.

In addition, some sources of data may be untrustworthy, and mistakes may be present. If the database contains sufficient information, mistakes and untrustworthy information may be mitigated or removed by taking the consensus of cumulative evidence.

Processing step 312 may also perform action-object pairing to capture relationships among words. For example, for the phrase "put the coffee in the closet," the word "put" may be identified as an action, and associated with object words "coffee" and "closet." This enables candidate actions to be identified for objects.

Step 312 may also perform tagging, lemmatizing or chunking. Tagging attributes a word type, e.g., verb, noun, etc., to each word. Lemmatizing converts a word into its "root" form, e.g., converts "is" to "be." Chunking converts a set of tagged words and converts them into a phrase. For example, a word tagged as a noun may be converted into a related phrase that is also tagged as a noun. These operations may also be used to add or improve relations among words.

Returning again to FIG. 3, a preliminary multidimensional semantic network (MSN) is constructed 318. An MSN is a multidimensional graph wherein each dimension represents a type of semantic network. The MSN includes nodes and edges. The nodes represent a variety of types of knowledge, including concepts, objects and properties, and each node comprises a name and knowledge type. For example, a node may have the name "dog" and type "object."

Edges define relationships between pairs of nodes, and each edge comprises a label and semantic type. The label identifies the particular edge instance, while the semantic type indicates the nature of the relationship between the pair of nodes connected. Within each dimension of the MSN, all of the edges have a common semantic type.

Figure 4:
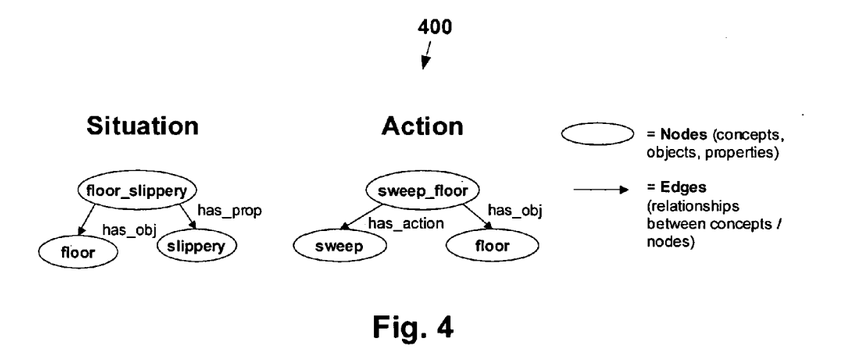
FIG. 4 illustrates exemplary nodes and edges of a multidimensional semantic network.

Two additional types of nodes are situation and actions, as illustrated in FIG. 4. A situation is the conjunction of an object and a property, while an action is the conjunction of an atomic action, i.e., elemental action and an object. These are thus examples of compound nodes, which advantageously embed notions of causality and responses to situations. Situation and action nodes are respectively generated from cause and response data within the database. Causes generate edges between pairs of situations, while responses generate edges between situations and actions.

Also shown in FIG. 4 are examples of the edge labels (i.e., edge types) has_obj(ect), has_prop(erty), and has_action. These and other edge labels and explanatory examples are listed in the table of FIG. 5. For example, the situation (compound) node "floor_slippery" will be connected to the node "floor" by an edge with label "has_object," indicating that "floor" is a conjunctive object of "floor_slippery." "Floor_slippery" will also be connected to the node "slippery" by an edge with label "has_property," indicating that "slippery" is a conjunctive property of "floor_slippery." Similarly, the nodes "sweep_floor" and "sweep" would be connected by an edge with label "has_action," indicating that "sweep" is an action associated with "sweep floor."

Figure 5:
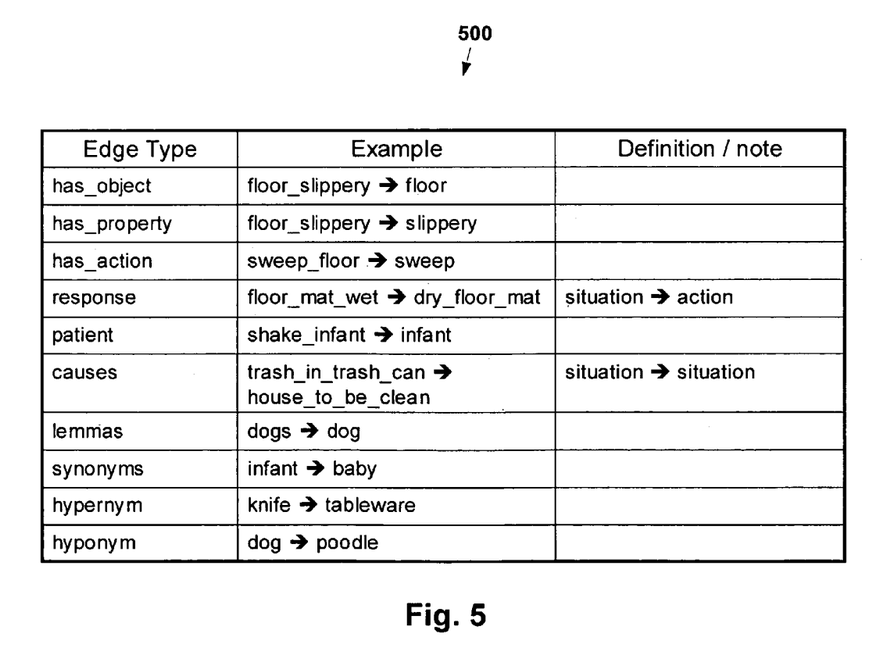
FIG. 5 illustrates exemplary dimensions of a multidimensional semantic network.
Figure 6:
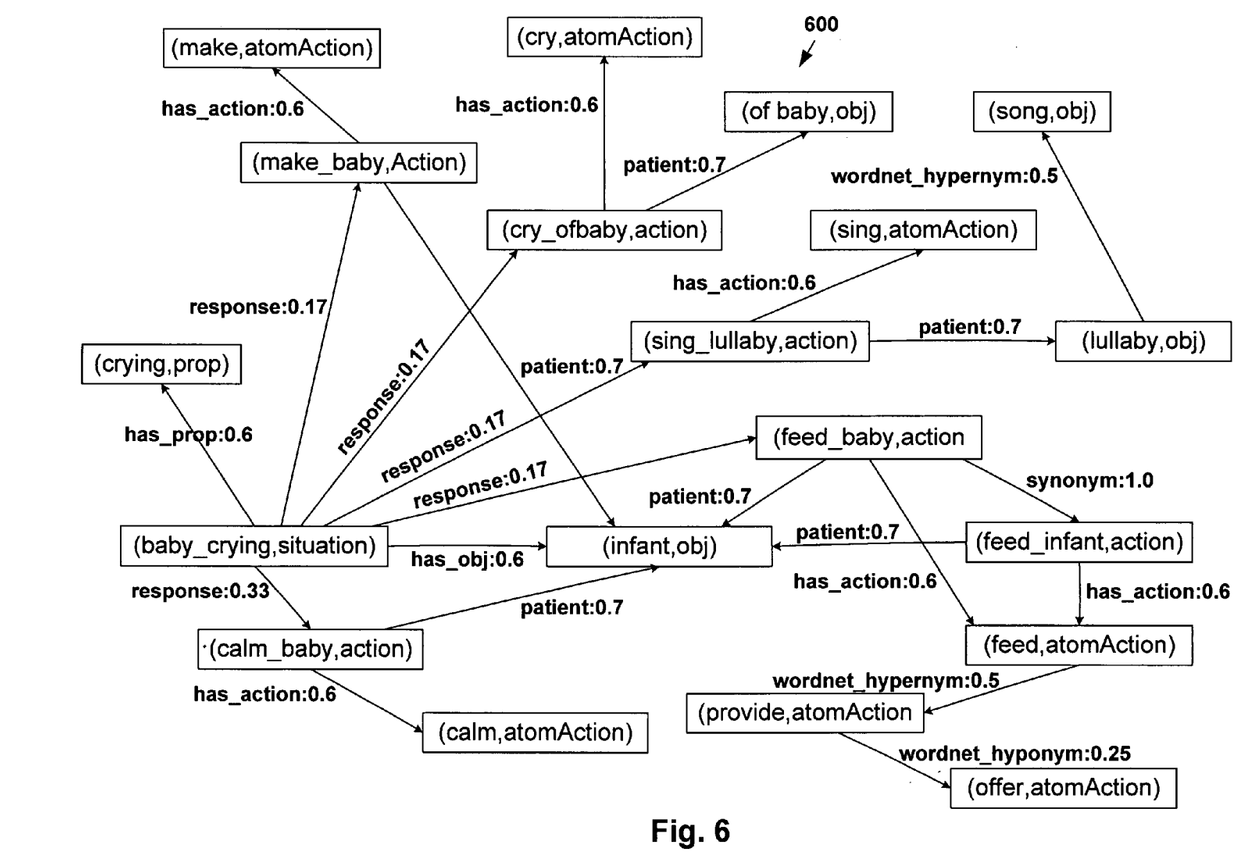
FIG. 6 illustrates a portion of an exemplary multidimensional semantic network.

Other edge labels include "response," whereby a situation is related to an action. For example, "dry_floor_mat" is an action that might be performed by a robot when the situation "floor_mat_wet" is perceived. The edge label "patient" indicates that one node might be the benefactor of another node representing an action, e.g., "infant" benefits from "shake_infant." Causality is expressed by the edge label "causes," e.g., "trash_in_trash_can" causes "house_clean." Lemmas are edge labels that may connect nodes that might appear together in a glossary entry, while Synonyms connect nodes with the same or similar meanings. Hypernyms and hyponyms relate nodes that are more or less generic than other nodes. For example, tableware is a hypernym of knife, while poodle is a hyponym of dog.

Mathematically, an MSN is a directed labeled graph defined by G={N,T,E,L,a(x),b(y)} where $N=\{n_1, n_2, n_3 \ldots n_x\}$ defines the node set,
$T=\{t_1, t_2, t_3 \ldots t_x\}$ defines the node type set,
$E=\{e_1, e_2, e_3 \ldots e_y\}$ defines the edge set,
$L=\{l_1, l_2, l_3 \ldots l_y\}$ defines the edge label set,
a(x) defines the type of a node such that $\forall x, a(x)=t_x, t_x, t_x \in T$
and
β(y) defines the label of the edge where $\forall y, \beta(y)=l_1, l_y \in L$.

By way of illustration, this graph includes T nodes and L edges, each of which has a label. A description of this can be found in Gupta and Pedro, "Praxi-Net: Knowledge Representation and Inference using the Open Mind Indoor Commonsense Data," Honda Research Institute USA, Inc., 2004, which is incorporated herein in its entirety.

The preliminary MSN thus obtained is relatively sparse, e.g., it lacks a sufficient number of semantic relations between nodes to be practically useful. This is in part a consequence of the fact that two people will use the same nomenclature for a particular well-known object less than twenty percent of the time. For example, one person might ask "Where can I find the goblet?" but another might substitute "chalice" for "goblet." Returning to FIG. 3, step 324 mitigates this shortcoming. Step 324 expands the MSN by adding edges that are defined by consulting auxiliary references, such as thesauri or lexical databases. In one embodiment, this is accomplished automatically using online references. The added edges typically comprise synonyms, hypernyms and hyponyms. Advantageously, "vocabulary robustness" is thereby fostered, since the stored knowledge will be representative of a larger composite of the population. In addition, additional inferences can be made through this process. A description of this can be found in Gupta and Pedro, "Praxi-Net: Knowledge Representation and Inference using the Open Mind Indoor Commonsense Data," which is cited above.

Figure 7:
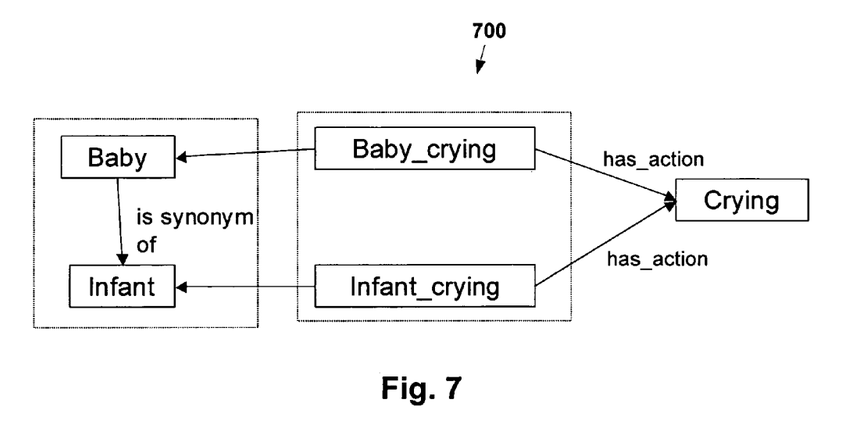
FIG. 7 illustrates exemplary compound relations within a multidimensional semantic network.

Additional MSN expansion may be accomplished by analyzing compound relations. For example, if two compound nodes have common intermediate nodes, then they may be related by adding edges. For example, as illustrated in FIG. 7, the compound nodes "baby_crying" and "infant_crying" are each related to node "crying" by edges with label "has_action." Therefore, existing nodes "baby" and "infant" can be linked by a synonym edge.

When the MSN has been fully expanded, it will contain redundant edges, or edges that will likely not be useful. Returning to FIG. 3, to maximize efficiency, the MSN is condensed 330. For example, some synonyms may not be bidirectional. That is, there may have been a basis for establishing that a first node is a synonym of a second node, but not vice versa, and thus resulting in a non-bidirectional synonym edge. Such edges are considered to be of lower utility than bidirectional synonyms, and as a consequence they are pruned from the MSN.

Unnecessary synonyms may be present, as indicated by "baby" and "infant" in the example of FIG. 12. Such synonyms are merged into a single node to eliminate redundancy as shown. However, it is important not to lose the original senses of merged words, and so a hash table is created to preserve merged synonyms. For every pair of synonyms ($n_1$, $n_2$), an entry ($n_2 \rightarrow n1$) is created and used to redirect the pertinent edges from $n_2$ to $n_1$. The resultant MSN exhibits an optimal balance between utility and complexity.

Returning to FIG. 2, the optimized MSN thus created is available for use in determining a response to a situation 220. As shown in more detail in FIG. 8, once a situation is perceived, the relevant subset of the MSN is extracted 806 into a Bayesian network, i.e., a Bayes network. A Bayes network is also comprised of nodes and edges. The nodes represent random variables, which may be discrete or continuous. The edges connect pairs of nodes; if there is an arrow from a node X to another node Y, X is said to be a parent of Y. Generally, a parent node has a direct influence on a child node, that is, a parent node generates an expectation for the nodes below. Each node $X_i$ has a conditional probability distribution $P(X_i|Parents (X_i))$ that quantifies the effect of the parents on the node below. Accordingly, the probability of a given node can be computed iteratively by working upward through the chain of nodes and edges. A discussion of this can be found in Artificial Intelligence: A Modern Approach, second edition, S. J. Russell and P. Norvig, Pearson Education Inc., 2003.

Figure 8:
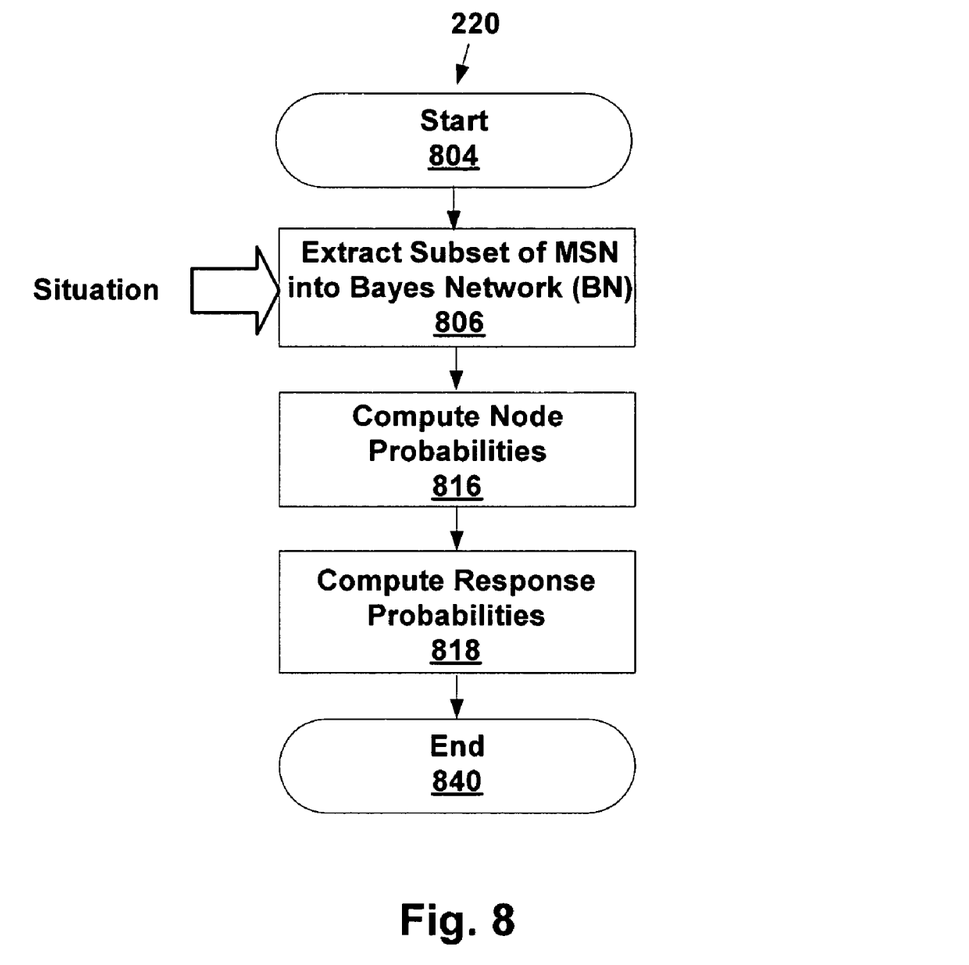
FIG. 8 illustrates one embodiment of the derivation of a Bayes network.

According to one embodiment, the causes and responses within the MSN pertinent to the situation of interest serve as the basis for extracting the Bayes network. The Bayes network thus extracted from the MSN is a simplified causal network with situations and responses as nodes. Furthermore, causes and response edges generate compound nodes including situations and actions.

Figure 9:
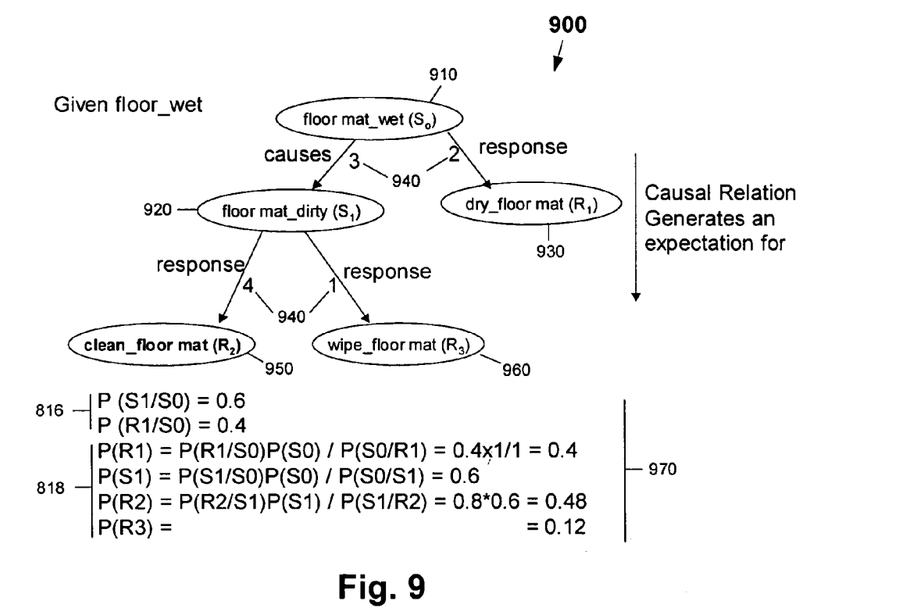
FIG. 9 illustrates an exemplary portion of a Bayes network and an exemplary response calculation.

For example, FIG. 9 shows an exemplary Bayes network synthesized from an MSN in response to the situation node 910 "floor mat_wet," or state S0. This node is the parent of situation node 920 "floor mat_dirty" (S1) and action node 930 "dry_floor mat" (R1).

Referring back to FIG. 8, a set of conditional node probabilities is computed within the Bayes network 816. These are shown at 940 in the example of FIG. 9. For example, when prompted with the situation "floor mat_wet," for every five persons queried during knowledge collection, three, or 0.6 of all respondents, responded that this situation causes "floor mat_dirty," while two persons, or 0.4 of all respondents, responded that this situation demands the response "dry_floor mat." These node probabilities may be expressed mathematically as $P(S1|S0)=0.6$ and $P(R1|S0)=0.4$, respectively.

The remaining response probabilities in FIG. 9 are similarly computed. This is indicated at step 818 of FIG. 8, and is shown in FIG. 9 at 970. As a result, of the three possible responses to the given situation, namely R1, R2 and R3, the consensus response (that is, the one with the highest probability) would be R2, with probability 0.48. Thus, according to the example of FIG. 9, a robot would choose R2 (clean_floor mat) as the most appropriate response to the given situation "floor mat_wet."

Figure 10:
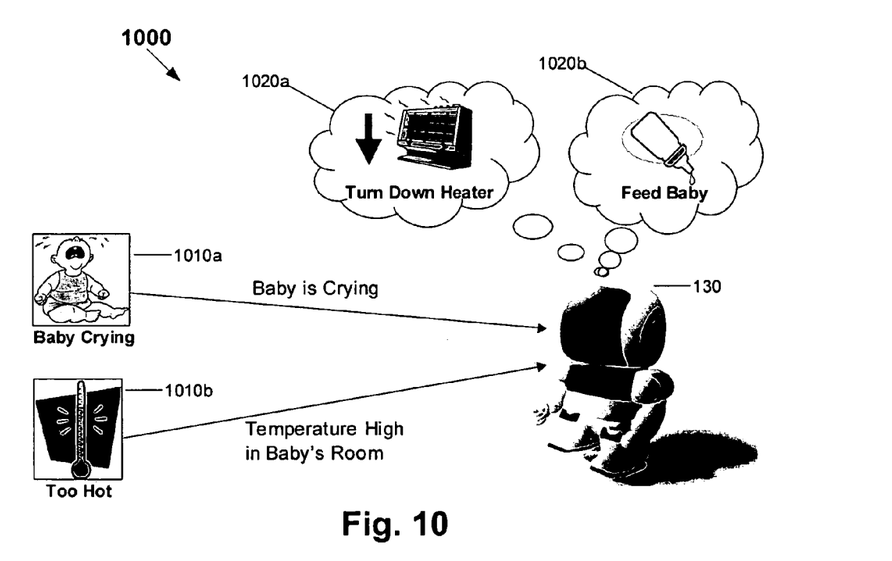
FIG. 10 illustrates exemplary response to multiple situations.

The method of the invention is not limited to the simple example given, but is capable of accommodating more complex situations. For example, inferencing multiple responses to multiple situations may be carried out concurrently as shown in FIG. 10. For each of the perceived situations 1010, the method described above would be applied to determine an appropriate response 1020 by robot 130.

The method of the invention is not limited to robotic applications. For example, a similar method may be applied to security applications, wherein one or more responses to a perceived anomalous situation within, for example, an airport or other facility, are calculated based on an appropriate knowledge database. Persons skilled in the art will appreciate that other applications may be accommodated by the method described as well.

Figure 11:
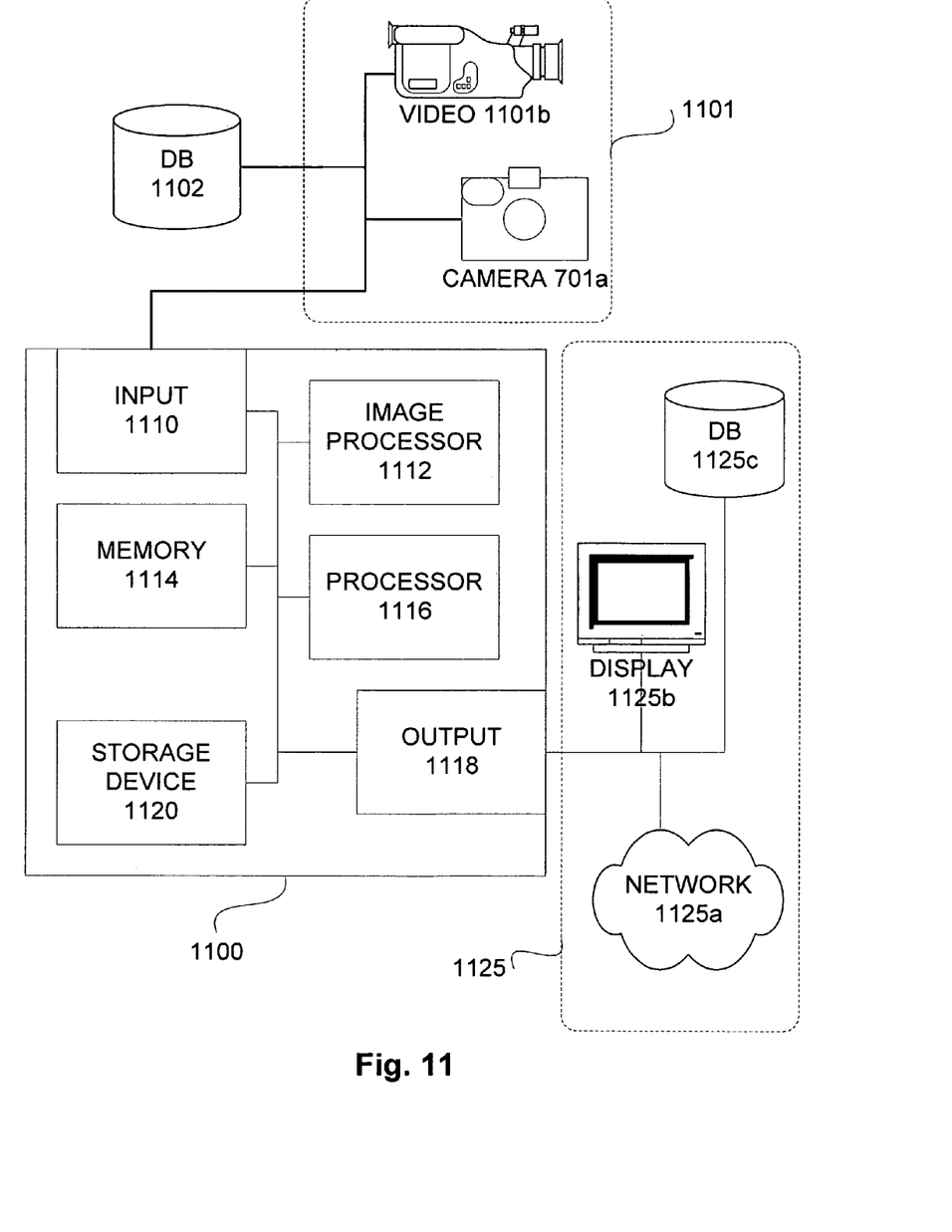
FIG. 11 illustrates a system for implementing one embodiment of the present invention.

Now referring to FIG. 11, a system according to one embodiment of the present invention is shown. Computer system 1100 comprises an input module 1110, a memory device 1114, a processor 1116, and an output module 1118. In an alternative embodiment, an image processor 1112 can be part of the main processor 1116 or a dedicated device to perceive situations as digital images captured in a preferred image format. Similarly, memory device 1114 may be a standalone memory device, (e.g., a random access memory chip, flash memory, or the like), or an on-chip memory with the processor 1116 (e.g., cache memory). Likewise, computer system 1100 can be a stand-alone system, such as, a server, a personal computer, or the like. Alternatively, computer system 1100 can be part of a larger system such as, for example, a robot having a vision system, a security system (e.g., airport security system), or the like.

According to this embodiment, computer system 1100 comprises an input module 1110 to receive the digital images I. The digital images, I, may be received directly from an imaging device 1101, for example, a digital camera 1101a (e.g., robotic eyes), a video system 1101b (e.g., closed circuit television), image scanner, or the like. Alternatively, the input module 1110 may be a network interface to receive digital images from another network system, for example, an image database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like.

An optional image processor 1112 may be part of the processor 1116 or a dedicated component of the system 1100. The image processor 1112 could be used to pre-process the digital images I received through the input module 1110 to convert the digital images, I, to the preferred format on which the processor 1116 operates. For example, if the digital images, I, received through the input module 1110 come from a digital camera 1110a in a JPEG format and the processor is configured to operate on raster image data, image processor 1112 can be used to convert from JPEG to raster image data.

The digital images, I, once in the preferred image format if an image processor 1112 is used, are stored in the memory device 1114 to be processed by processor 1116. Processor 1116 applies a set of instructions that when executed perform one or more of the methods according to the present invention, e.g., synthesizing an MSN, a Bayes network, calculating response probabilities and the like, as described herein. While executing the set of instructions, processor 1116 accesses memory device 1114 to perform the operations according to methods of the present invention on the image data stored therein.

Processor 1116 interprets a situation from the input images, I, and outputs indications of calculated responses through the output module 1118 to an external device 1125 (e.g., a database 1125a, a network element or server 1125b, a display device 1125c, or the like). Like the input module 1110, output module 1118 can be wired or wireless. Output module 1118 may be a storage drive interface, (e.g., hard-drive or optical drive driver), a network interface device (e.g., an Ethernet interface card, wireless network card, or the like), or a display driver (e.g., a graphics card, or the like), or any other such device for outputting the response or responses determined.

Advantages of the present invention include scalability to accommodate on the order of millions of pieces of information. The method of the invention is independent of the language and actual words that comprise the knowledge base. Where multiple responses are possible for a given situation, the consensus response is determined based on the relative frequencies of response of the subjects who contribute the knowledge. The restriction to indoor domains makes the knowledge base sufficiently dense to be statistically useful for inferencing. Furthermore, inferencing over multiple situations is possible. Knowledge regarding synonymous concepts is combined to make the knowledge base more dense for improved inferencing.

Upon reading this disclosure, those of skill in the art will appreciate still additional alternative structural and functional designs for a system and a process for responding to situations through knowledge representation and inference through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer based method for analyzing a knowledge database, comprising the steps of:
   receiving data collected by a distributed capture technique;
   synthesizing a multidimensional semantic net (MSN) including two or more nodes and one or more edges connecting two or more nodes from said data;
   generating an expanded MSN by retrieving supplemental data from one or more auxiliary sources and adding one or more edges associating the supplemental data with a node to the MSN;
   determining semantic relationships between said nodes;
   adding edges to the expanded MSN associating the supplemental data with a node included in the expanded MSN based on said semantic relationships;
   removing an added edge having a semantic relationship from a group comprising non-bidirectional synonyms, hypernym pairs or hyponym pairs;
   deriving a Bayes network from said expanded MSN, the Bayes network including a plurality of groups, each group including a situation, a response describing an action and a relative probability describing an association between the situation and the response;
   selecting a group having a maximum relative probability from the plurality of groups; and
   storing a response included in the group having the maximum probability in a computer readable memory.

2. The method of claim 1, wherein the step of receiving data further comprises receiving said data from multiple users or from multiple locations.

3. The method of claim 2, wherein said distributed capture technique comprises the step of prompting a plurality of users to supply one or more words in response to a query.

4. The method of claim 1, further comprising the step of associating causality and response relations to one or more situations.

5. The method of claim 1, further comprising the step of processing said data, including at least one of:
   checking a spelling of a word;
   removing a template by eliminating a non-essential word;
   tagging a part of speech to a word;
   lemmatizing a word into its root form;
   chunking two or more tagged words into a tagged phrase; or
   removing extraneous data.

6. The method of claim 1, wherein said two or more nodes comprise at least one of: object, property, atom action, action, or situation.

7. The method of claim 1, wherein each said relative probability is calculated from a frequency of said data within the knowledge database.

8. The method of claim 7, wherein said nodes further comprise situation nodes and response nodes.

9. The method of claim 1, wherein the auxiliary source comprises a thesaurus or a lexical database.

10. A system for analyzing a knowledge database, comprising:
    means for receiving data collected by a distributed capture technique;
    means for synthesizing a multidimensional semantic net (MSN) including two or more nodes and one or more edges connecting two or more nodes from said data;
    means for generating an expanded MSN by retrieving supplemental data from one or more auxiliary sources and adding one or more edges associating the supplemental data with a node to the MSN;
    means for determining semantic relationships between said nodes;
    means for adding edges to the expanded MSN associating the supplemental data with a node included in the expanded MSN based on said semantic relationships;
    means for removing an added edge having a semantic relationship from a group comprising non-bidirectional synonyms, hypernym pairs or hyponym pairs;
    means for deriving a Bayes network from said expanded MSN, the Bayes network including a plurality of groups, each group including a situation, a response describing an action and a relative probability describing an association between the situation and the response;
    means for selecting a group having a maximum relative probability from the plurality of groups; and
    means for storing a response included in the group having the maximum relative probability in a computer readable memory.

11. The system of claim 10, wherein said means for receiving data further comprises receiving data from multiple users or from multiple locations.

12. The system of claim 11, wherein said distributed capture technique comprises means for prompting a plurality of users to supply one or more words in response to a query.

13. The system of claim 10, wherein said means for receiving data further comprises means for associating causality and response relations to one or more situations.

14. The system of claim 10, wherein said means for receiving data further comprises means for processing said data, including at least one of:
    means for checking a spelling of a word;
    means for removing a template by eliminating a non-essential word;
    means for tagging a part of speech to a word;
    means for lemmatizing a word into its root form;
    means for chunking to combine two or more tagged words into a tagged phrase; or
    means for removing extraneous data.

15. The system of claim 10, wherein said two or more nodes comprise at least one of: object, property, atom action, action, or situation.

16. The system of claim 10, wherein each said relative probability is calculated from a frequency of said data within the knowledge database.

17. The system of claim 16, wherein said nodes further comprise situation nodes and response nodes.

18. The system of claim 10, wherein the auxiliary source comprises a thesaurus or a lexical database.

19. A computer readable storage medium tangibly storing computer program instructions and data for implementing a method for analyzing a knowledge database, the method comprising the steps of:
    receiving data collected by a distributed capture technique;
    synthesizing a multidimensional semantic net (MSN) including two or more nodes and one or more edges connecting two or more nodes from said data;

generating an expanded MSN by retrieving supplemental data from one or more auxiliary sources and adding one or more edges associating the supplemental data with a node to the MSN;

determining semantic relationships between said nodes;

adding edges to the expanded MSN associating the supplemental data with a node included in the expanded MSN based on said semantic relationships;

removing an added edge having a semantic relationship from a group comprising non-bidirectional synonyms, hypernym pairs or hyponym pairs;

deriving a Bayes network from said expanded MSN, the Bayes network including a plurality of groups, each group including a situation, a response describing an action and a relative probability describing an association between the situation and the response;

selecting a group having a maximum relative probability from the plurality of groups; and storing a response included in the group having the maximum probability in a computer readable memory.

20. The computer readable storage medium of claim 19, wherein the step of receiving data further comprises receiving said data from multiple users or from multiple locations.

21. The computer readable storage medium of claim 20, wherein said distributed capture technique comprises the step of prompting a plurality of users to supply one or more words in response to a query.

22. The computer readable storage medium of claim 19, wherein said receiving data further comprises the steps of associating causality and response relations to one or more situations.

23. The computer readable storage medium of claim 19, wherein said receiving data further comprises the step of processing said data, including at least one of the steps of:

checking a spelling of a word;

removing a template by eliminating a non-essential word;

tagging a part of speech to a word;

lemmatizing a word into its root form;

chunking two or more tagged words into a tagged phrase; or removing extraneous data.

24. The computer readable storage medium of claim 19, wherein said two or more nodes comprise at least one of object, property, atom action, action, or situation.

25. The computer readable storage medium of claim 19, wherein each said relative probability is calculated from a frequency of said data within the knowledge database.

26. The computer readable storage medium of claim 25, wherein said nodes further comprise situation nodes and response nodes.

27. The computer readable storage medium of claim 19 wherein the auxiliary source comprises a thesaurus or a lexical database.

* * * * *